United States Patent [19]

Tanaka et al.

[11] 4,223,915
[45] Sep. 23, 1980

[54] SEATBELT SYSTEM

[75] Inventors: Hideki Tanaka, Toyota; Tatsushi Kubota, Okazaki; Jun Yasumatsu, Toyota; Yoshio Tsujiuchi, Nagoya, all of Japan

[73] Assignees: Toyota Jidosha Kogyo Kabushiki Kaisha; Kabushiki Kaisha Tokai Rika Denki Seisakusho, both of Aichi, Japan

[21] Appl. No.: 37,103

[22] Filed: May 8, 1979

[30] Foreign Application Priority Data

Sep. 18, 1978 [JP] Japan .................. 53/114255

[51] Int. Cl.³ .............................. B60R 21/10
[52] U.S. Cl. ........................... 280/804; 280/806; 280/808
[58] Field of Search ........... 280/804, 806, 808, 803, 280/802; 297/469, 473, 479, 480, 483

[56] References Cited

U.S. PATENT DOCUMENTS

| 3,419,308 | 12/1968 | Apri | 297/480 |
| 3,439,932 | 4/1969 | Lewis et al. | 280/806 |
| 4,039,224 | 8/1977 | Bauer et al. | 280/804 |
| 4,159,848 | 7/1979 | Manz et al. | 297/483 |

Primary Examiner—John J. Love
Assistant Examiner—Donn McGiehan
Attorney, Agent, or Firm—Koda and Androlia

[57] ABSTRACT

A seatbelt system which automatically fastens and unfastens a passenger restraining belt about a passenger including a slider to which is fastened one end of the passenger restraining belt, a guide rail fastened along the body of the vehicle which guides the slider and which has one portion which is vertical, a drive system for moving the slider along the guide rail, a pawl for engagement with the slider when the slider is guided into the vertical portion of the guide rail and an acceleration detector for causing the pawl to engage with the slider during a vehicular emergency whereby movement of the slider is prevented and the belt is maintained in a fastened condition even during a vehicular roll over.

10 Claims, 7 Drawing Figures

SEATBELT SYSTEM

BACKGROUND OF THE INVENTION

1. Field of Invention

This invention relates to seatbelt systems and more particularly to seatbelt systems which automatically fasten a restraining belt about a passenger after he has seated himself.

2. Prior Art

Since seatbelt systems protect passengers by restraining them with a belt during vehicular emergencies, the passenger does not collide with dangerous objects and his safety is insured. However, for reasons such as the difficulty of fastening the restraining belt, etc., the proportion of wearers of seatbelts is very low.

For the above reason, seatbelt systems are presently proposed which can automatically fasten a restraining belt about the passenger after he has seated himself. In these seatbelt systems, a guide rail is provided on the vehicle body and a belt may be caused to approach or receed from a seated passenger by a slider, to which the outer end of a belt is fastened, which is able to move along the guide rail.

Among such seatbelt systems, the seatbelt system wherein a part of the guide rail at the rear of the vehicle is bent in a vertical direction and the guide path of the guide rail is basically vertical is preferred. Since the slider is prevented from moving forwards or backwards in a vehicular emergency by the rear part of the guide rail being vertical, the passenger may be brought into a secure belt fastened condition merely by the motion of the slider along the guide rail and the slider is prevented from moving forwards or backwards in the vehicle during vehicular emergenices without the provision of a special lock system and a complicated regulation system for the lock system.

With such a system, in a normal vehicular collision the slider is prevented from moving forward or backward in the vehicle by the guide rail and the passenger is maintained in a fastened condition. If the vehicle rolls over however, vertical forces may act on the slider to cause it to move along the vertical part of the guide rail and the restraint of the passenger will become uncertain. As a result, there is a possibility that the passenger's safety in such a vehicular emergency may be incomplete.

SUMMARY OF THE INVENTION

Accordingly, it is the general object of the present invention to provide a seatbelt system wherein the rear part of the guide rail is vertical and in which the slider cannot move in the vertical portion of the guide rail during a vehicular emergency.

In keeping with the principles of the present invention, the objects are accomplished by a unique seatbelt system which includes a pawl operated by an acceleration detector which engages with the slider during a vehicular emergency. Since the motion of the slider in the guide rail is prevented by the engagement of the pawl with the slider, the outer end of the belt is securely fastened during vehicular emergencies and the passengers safety is increased.

BRIEF DESCRIPTION OF THE DRAWINGS

The above mentioned features and objects of the present invention will become more apparent with reference to the following description taken in conjunction with the accompanying drawings wherein like reference numerals denote like elements, and in which.

DETAILED DESCRIPTION OF THE INVENTION

Figure 1:
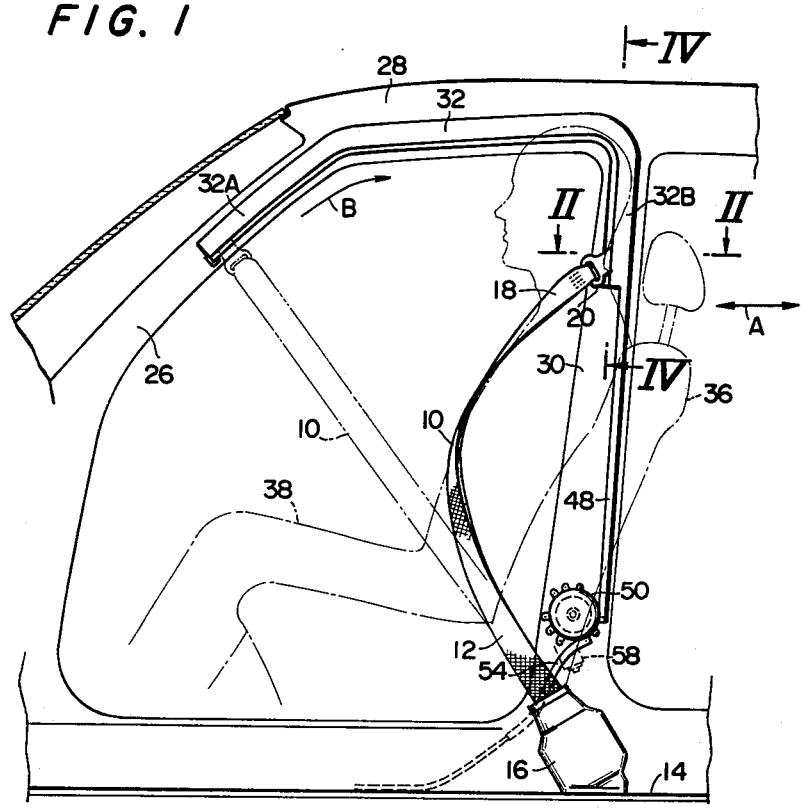
FIG. 1 is an interior side view illustrating one embodiment of the seatbelt system in accordance with the teachings of the present invention.

Referring more particularly to the drawing, shown in FIG. 1 is a seatbelt system in accordance with the teachings of the present invention. In FIG. 1, the inner end 12 of the passenger restraining belt 10 is wound up by a retractor 16 which is fastened to the floor 14 of the motor vehicle. The retractor 16 is mounted along the center of the vehicle and winds up the passenger restraining belt 10 by its own force. The retractor 16 is further fitted with an inertial locking mechanism which can instantly stop the extension of the belt 10 during a vehicular emergency.

The outer end 18 of the belt 10 is fastened to an anchor plate 20 and the anchor plate 20 is fastened to a slider 24 by fastening bolt 22. Slider 24 is provided in a guide groove 24 (see FIG. 2) formed in the longitudinal direction of a guide rail 32 which is fastened along the front pillar 26, roof side 28 and center pillar 30. The slider 24 may move along the guide groove 34 in the longitudinal direction of the guide rail 32.

Here, as shown by the double dot interrupted lines in FIG. 1, when the passenger enters or exits the vehicle, slider 24 moves toward the front end 32A of guide rail 32 and thereby moves belt 10 toward the front of the passenger 38 seated in the seat 36. In this way a space for entering or exiting for the passenger 38 is formed. When the passenger 38 has seated himself, the slider 24 moves to the lower end of vertical part 32B along center pillar 30 and, as is shown by the double dot lines in FIG. 1, belt 10 is caused to approach passenger 38 and places the passenger 38 in a belt fastened condition.

Furthermore, when slider 24 is within the vertical part B of guide rail 32 along the center pillar 30, forward or backward motion of the anchor plate together with slider 24 in the vehicle is prevented and the passenger is reliably protected since the slider 24 may not move forwards or backwards in the vehicle (as indicated by the arrow A in FIG. 1) and anchor plate 20 holds the outer end 18 of the belt 10.

Projections 40 are formed on the rear side of the anchor plates 20 and these projections 40 are received by rectangular grooves 46, a plurality of which are formed at appropriate spacing in guide tape 44. Guide tape 44 is provided in a tape groove 42 formed approximately perpendicular to guide groove 34 in guide rail 32. The tape groove 42 is formed along the longitudinal direction of the guide rail 32 in somewhat the same manner as the guide groove 34 and the guide tape 44 slides in tape groove 42 to drive slider 24.

Figure 3:
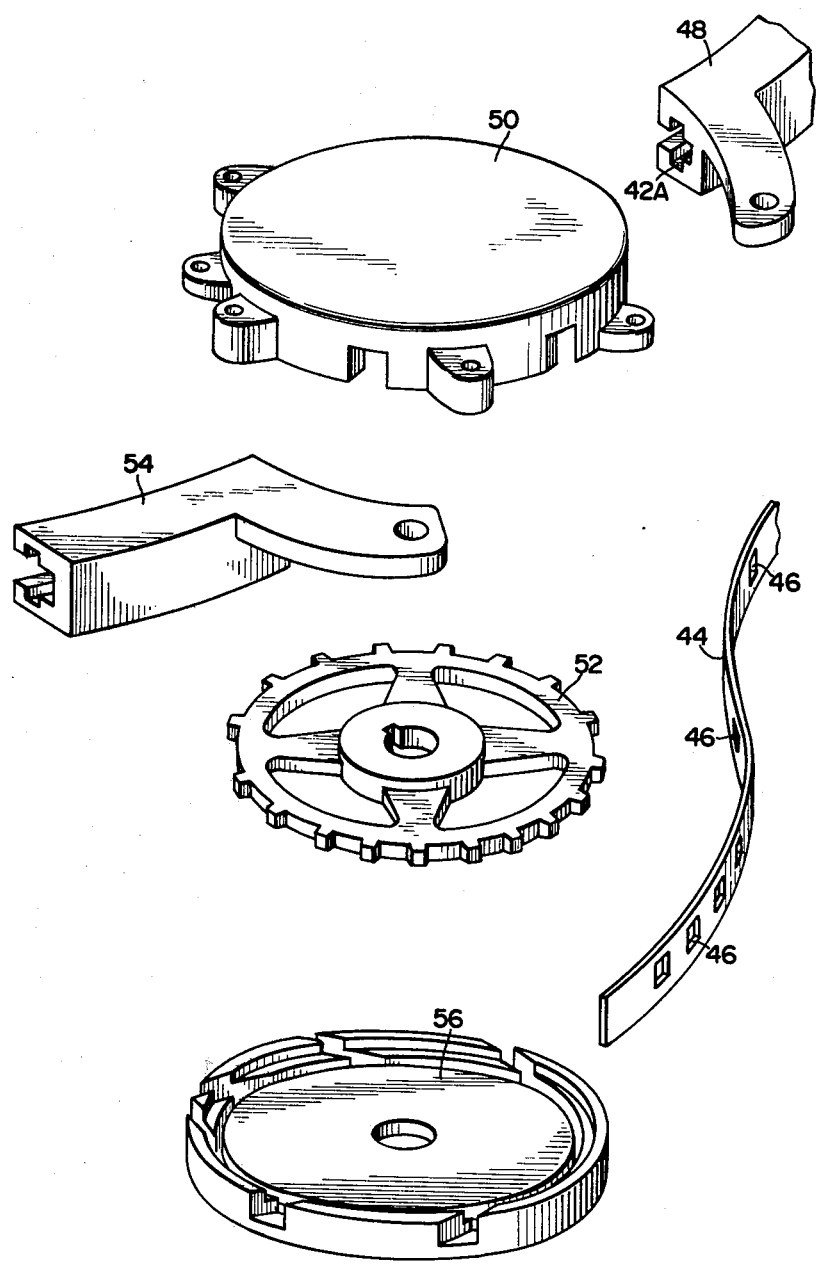
FIG. 3 is an exploded closeup view illustrating the assembly of a sprocket wheel and sprocket housing.

A second guide rail 48 descends along the center pillar 30 from the lower end of the vertical part of guide rail 32 and tape groove 42A formed in second guide rail 48 as connected to tape groove 42. The lower end of second guide rail 48 connects to a sprocket housing 50 which is fastened to a lower part of center pillar 40. The rectangular openings 46 in guide tape 44 engage with sprocket wheel 52 which is provided in the sprocket housing 50 (see FIG. 3).

A third guide rail 54 is coupled to the sprocket housing 50 for receiving the guide tape 44 extruded after engaging with sprocket wheel 52. Furthermore sprocket wheel 52 within sprocket housing 50 is rotated by the output shaft of motor 58 which passes through lid 56. As a result of the rotation of the sprocket wheel 52, guide tape 44 moves along guide rail 32 and second and third guide rails 44 and 54 and anchor plate 20, engaging with projection 40, is moved along guide rail 32 with slider 24.

The motor 58 is arranged and configured to operate after sensing the entering or exiting of a passenger. For example, when a passenger closes the door after seating himself, sprocket wheel 52 is rotated in a clockwise direction and slider 24 is moved towards the rear of the guide rail 32 (in the direction of arrow B); when the passenger 38 opens the door in order to exit the sprocket wheel 52 is rotated in the reverse direction to move the anchor plate 20 towards the front of the guide rail 30. In each case, anchor plate 20 is moved to the front or the rear end of the guide rail 32 in conjunction with the slider 24.

Figure 2:
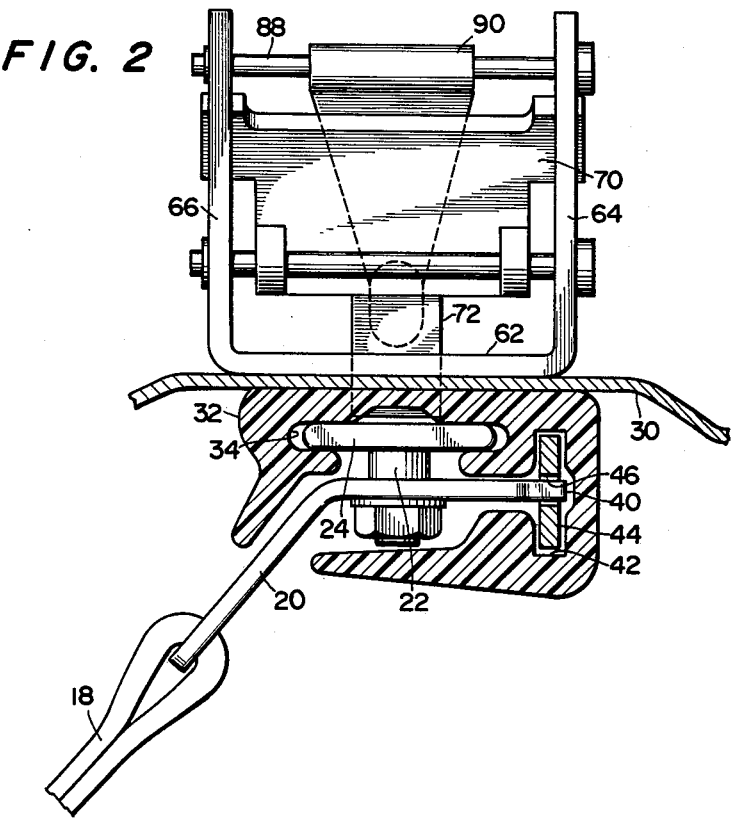
FIG. 2 is a cross sectional view along the line of II—II in FIG. 1.
Figure 4:
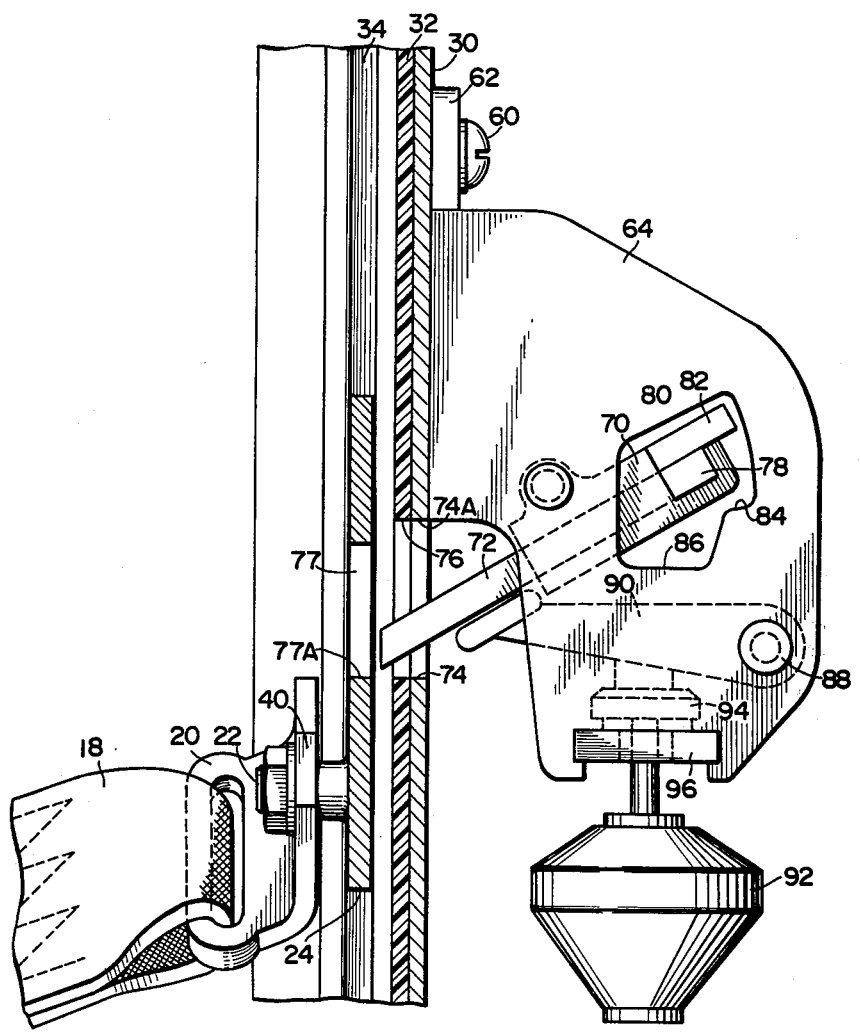
FIG. 4 is a cross sectional view along the line IV—IV in FIG. 1.
Figure 5:
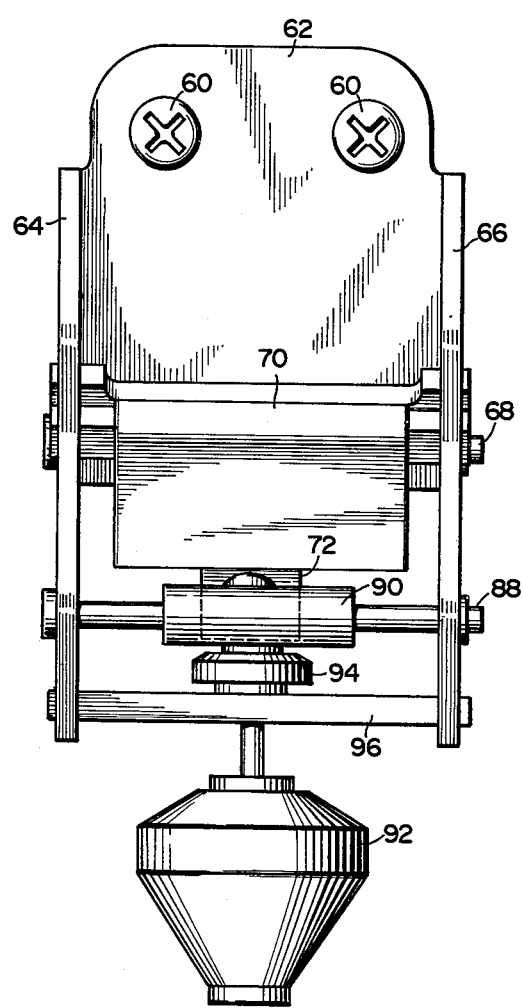
FIG. 5 is a side view of FIG. 4.
Figure 6:
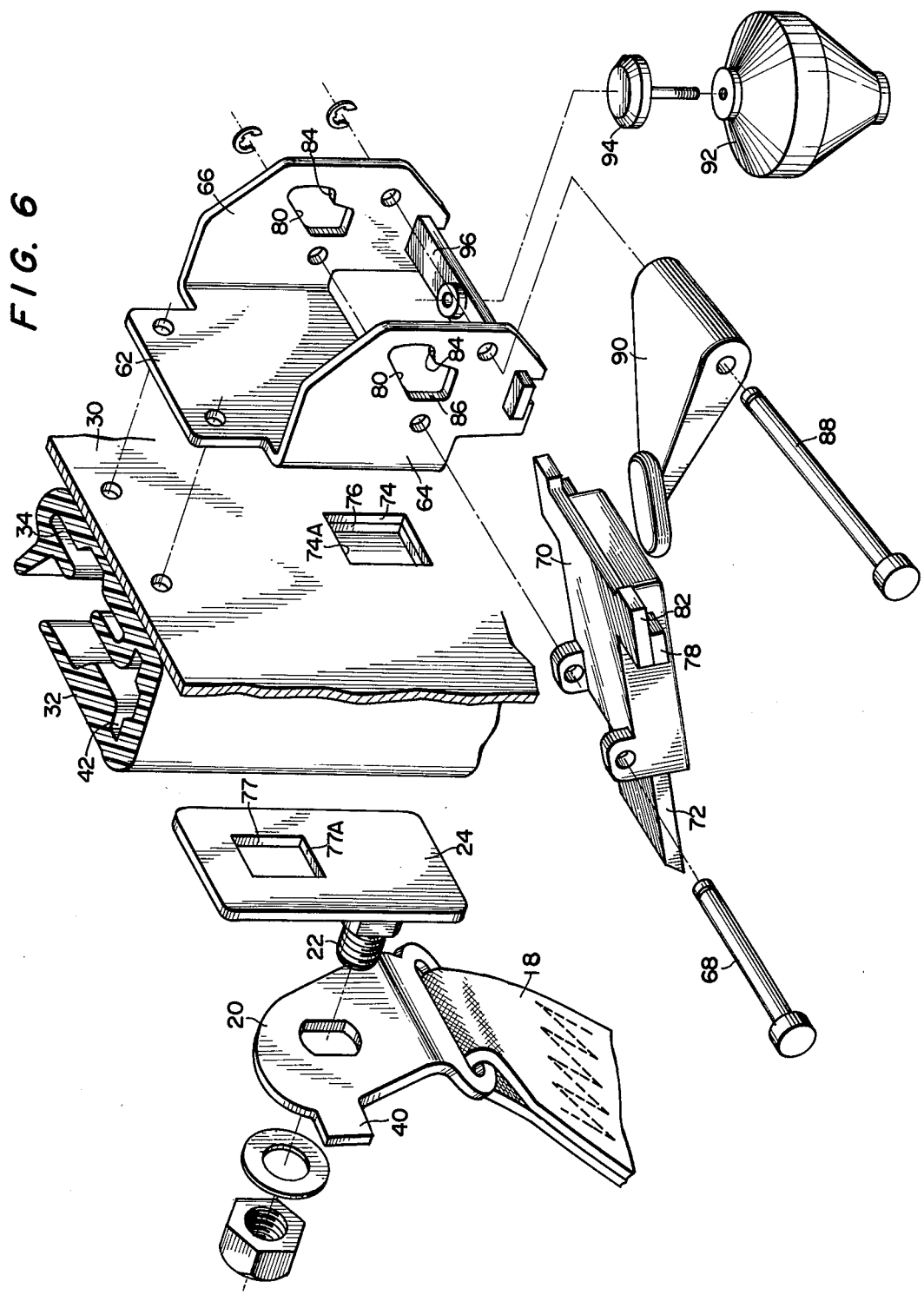

As shown in FIGS. 4 and 5, a bracket 62 is fastened by fastening screw 60 to the outer side of the vertical part of guide rail 32 which is fastened along center pillar 30. As is shown in FIG. 2, the bracket 62 is C-shaped and includes legs 64 and 66 and an axle 68 provided between the legs 64 and 66. A swinging arm 70 is coupled to the axle 68 and the swining arm 70 may be made from plastic. A metal pawl 72 is molded integrally with the swinging arm 70 and the front end of the pawl 72 is introduced through a hole 76 formed in the guide rail 30 and hole 74 formed in the center pillar 30 opposite engagement hole 77 formed in slider 24.

Also, the other end of the middle pawl 72 is a receiver part 78 which is perpendicular to the front part and passes through door shaped hole 80 provided in legs 64 and 66. One part of the swinging arm 70 is also formed into a receiver part 82 along receiver part 78 of pawl 72 and extends in the direction of legs 64 and 66 towards the door shaped holes 80. Here, projections 84 protrude into the door shaped holes 80 to thereby decrease the area of the door shaped holes 80 and matching with the receiver part 82. Also, receiver part 78 of metal pawl 72 matches with the bottom surface 86 of the door shaped hole 80.

As shown by the solid lines in FIG. 4, under normal circumstances, metal pawl 72 and swinging arm 70 are in a position such that the front part of the metal pawl 72 is at its lowest position and receiver part 78 and 82 are separated from projection 84 and bottom surface 86 respectively. When pawl 72 and swinging arm 70 rotate clockwise about axel 68 at the center, receiver part 82 first engages with projection 84. Also, when a large restraining force is applied after receiver part 82 has engaged with projections 84, receiver part 82 deforms and metal receiver part 78 comes in contact with the bottom surface 86 of the door shaped hole 80. Furthermore, when the swinging arm 70 and 72 are vibrated by an oscillation, etc., of the vehicle, noise is not generated by the device since receiver part 82 engages with projection 84.

An axle 88 is fastened horizontally between legs 64 and 66 below axle 68 and a lever 90 is rotatably coupled thereto. Front end of the lever 90 approaches the bottom surface of the pawl 72. A bob head 94 to which is fastened a bob 92 is provided subjacent the lever 90 and at the approximate center thereof. The bob head 94 is suspended from a bracket 96 which is mounted on legs 64 and 66 and the top surface is horizontal under normal vehicular driving conditions. When bob 92 detects a vehicular acceleration and swings, lever 90 rotates about axle 88 so that lever 90 causes pawl 72 to rotate about axle 68.

For the purposes of describing this embodiment it is assumed that in FIG. 1 is illustrated the condition where the passenger 38 is seated and the belt 10 has automatically been fastened about the passenger 38. In such a belt fastened condition, when the passenger 38 changes his driving condition, movement of his upper body causes the inner end 12 of the belt 10 to extend from the retractor 16 against the retracting force. In this situation, since the anchor plate 20 is prevented by guide rail 32 from moving forward or backward in the vehicle, the anchor plate 20 does not move. Also, pawl 72 makes small rotations about axle 68 because of vehicular oscillation, etc., but the receiver part 82 of swinging arm 70 only lightly contacts door shaped hole 80 so that the production of noise is prevented.

Next, in a vehicular emergency such as a collision which is other than a vehicle roll over, the passenger 38 is securely restrained by the belt 10 since the unwinding of belt 10 is instantly stopped by the inertial locking mechanism (not shown) within the retractor 16. That is, the outer end 18 of belt 10 is fastened to anchor plate 20 and since anchor plate 20 lies within the vertical part 32B of guide rail 32, forward or backward motion is prevented and the passenger is not thrown toward the front of the vehicle and collision with dangerous objects is prevented.

In addition, in a situation where the vehicle rolls over, since the weight operates vertically on anchor plate 20, it moves along the vertical part of guide rail 32 and it is possible that the outer restraint for the passenger 38 by anchor plate 20 would be incomplete. However, during vehicular emergencies since bob 92 moves lever 90, pawl 72 engages with engagement hole 77 of slider 24 to thereby stop the motion of the slider 24 along the vertical part of guide rail 32. Thus the passenger 38 is held in a securely restrained condition by the belt 10 and in the same manner as during a normal collision.

When the pawl 72 engages with engagement hole 77 and if slider 24 received a large motive force directed towards the top of the vehicle, receiver part 82 deforms and metal part 78 comes into contact with the bottom surface 86 of the door shaped hole 80 so that the front edge of pawl 72 comes into contact with the bottom 77A of the engagement hole 77 formed in slider 24, the top surface 74A of hole 77 formed in center pillar 30 and the bottom surface 86 of door shaped hole 80, respectively, thereby supporting the vertically acting weight of slider 24. Furthermore since the motive force of slider 24 does not operate on axle 68, reliable support is possible.

If a passenger wishes to exit and opens the door, motor 58 moves guide tape 44 in the direction opposite to arrow B of FIG. 1 to thereby move anchor plate 20 along guide rail 32 to the front of the vehicle and as shown by the double dot interrupted lines of FIG. 1, belt 10 separates from the passenger 38. As a result the passenger may easily exit. Also, when the passenger enters the vehicle and if he closes the door after seating himself, the motor 58 reverses and anchor plate 20 is once again moved to the bottom end of vertical part 32B of guide rail 32 and the passenger 38 is automatically brought into the belt fastened condition.

Figure 7:
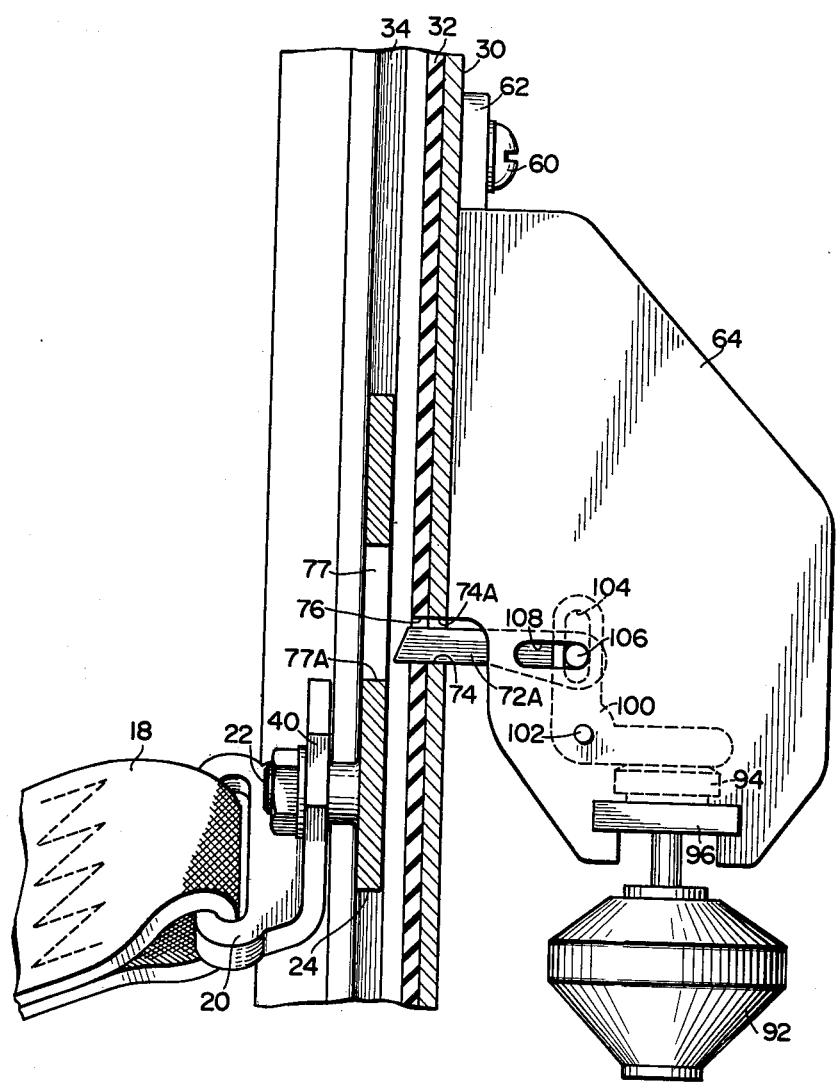
FIG. 7 is a cross sectional view analagous to FIG. 4 illustrating the second embodiment of the present invention.

Now referring to FIG. 7, shown therein is a second embodiment of the present invention. In the second embodiment a rocker arm 100 is interposed between the bob head 94 and pawl 72A. That is, rocker arm 100 is mounted between legs 64 and 66 by a pin 102. Rocker arm 100 is bent such that one portion is substantially horizontal and lies on top of bob head 94 and the other end is substantially vertical and has a slot 104 provided therein. Pin 102 is provided at the point the horizontal and vertical portions meet. A pin 106 is introduced through the base part of pawl 72A and slot 104 and both ends of pin 106 are supported in guide slots 108 provided in legs 64 and 66. Therefore, pawl 72A may rotate about pin 106 as a center and the region near the end is supported by hole 74.

In the second embodiment, since bob 92 swings during a vehicular roll over, rocker arm 100 rotates counter clockwise in FIG. 7 and pin 106 moves in slot 108 so that the front end of pawl 72 is introduced through engagement hole 77 and stops the motion of slider 24. In the second embodiment, when a large motive force is applied to slider 24, the bottom surface 77A of engagement hole 77, the rop surface 74A of hole 74 in slot 108 support pawl 72 and pin 106 respectively. Also, when bob 92 oscillates slightly under normal driving conditions, noise is minimal since pawl 78 moves slightly in the horizontal direction.

As described above, the seatbelt system of the present invention has an acceleration detector and a pawl operated by the acceleration detector so that the pawl can engage with the slider of the seatbelt system at the portion where the slider is guided along the vertical part of the guide rail. In this manner the end of the belt 10 is securely fastened to the body of the vehicle during vehicular emergencies by a simple system and the passengers safety is increased.

It should be apparent to those skilled in the art that the above described embodiments are merely illustrative of a few of the many possible specific embodiments which would present the applications of the principles of the present invention. Numerous and varied other arrangements can be readily devised by those skilled in the art without departing from the spirit and scope of the invention.

I claim:

1. A seatbelt system for a motor vehicle which automatically fastens and unfastens a restraining belt about a passenger comprising:
    a slider to which one end of said passenger restraining belt is fastened;
    a guide rail for guiding said slider fastened along a body of said vehicle and having at least one vertical portion;
    a drive system for moving said slider along said guide rail;
    a pawl provided adjacent said vertical part of said guide rail for engaging with said slider when said slider is in said vertical portion; and
    an acceleration sensor causing said pawl to engage with said slider during a vehicular emergency whereby movement of the slider is prevented and the belt is maintained in a fastened condition even in a vehicular roll over.

2. Seatbelt system according to claim 1 wherein the vertical portion of said guide rail is provided along a center pillar of said body of said motor vehicle.

3. A seatbelt system according to claim 2 wherein said slider is provided with an engagement hole and said pawl engages with said engagement hole.

4. A seatbelt system according to claim 3 wherein said pawl is rotatably coupled to a bracket fastened to said center pillar.

5. A seatbelt system according to claim 4 further comprising a swinging arm and a projection coupled to said bracket which engages with said swinging arm during a roll over of said motor vehicle, said swinging arm being coupld to said pawl and said pawl contacting said bracket when said swinging arm is deformed.

6. A seatbelt system according to claim 5 wherein the center of mass of said pawl and said swinging arm is arranged such that under normal circumstances the pawl is separated from engagement with said engagement hole in said slider.

7. A seatbelt system according to claim 6 wherein said pawl passes through a hole provided in said center pillar opposite the slider in said guide rail and wherein during vehicular roll overs the front end of the pawl is supported by the engagement hole in said slider, the center part of said hole in said center pillar and the back part of said bracket whereby the belt is securely held to said center pillar.

8. A seatbelt system according to claim 7 wherein said acceleration detector is a bob which causes the pawl to rotate during vehicular emergencies.

9. A seatbelt system according to claim 3 wherein said pawl is guided through a slot in said bracket and said bracket is fastened to a center pillar directly facing said engagement hole and said slider.

10. A seatbelt system according to claim 8 wherein said pawl is coupled to said acceleration detector by a rocker arm.

* * * * *